United States Patent [19]
Lichtenberg et al.

[11] Patent Number: 6,136,422
[45] Date of Patent: *Oct. 24, 2000

[54] SPRAY BONDED MULTI-PLY TISSUE

[75] Inventors: Ralph B. Lichtenberg, Lincoln, Me.; Joseph H. Torras, Sr., Shelburne, Mass.; Eric C. Taylor; Michael Brown, both of Lincoln, Me.

[73] Assignee: Eatern Pulp & Paper Corporation, Amherst, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/628,386

[22] Filed: Apr. 5, 1996

[51] Int. Cl.$^7$ ..................................... A47K 10/16
[52] U.S. Cl. .................. 428/219; 428/340; 428/535; 428/537.5
[58] Field of Search .................. 156/229, 187; 162/132, 134; 428/535, 537.5, 152, 153, 154, 156, 219, 220, 172, 174; 264/121

[56] References Cited

U.S. PATENT DOCUMENTS

| | | | |
|---|---|---|---|
| 3,654,020 | 4/1972 | Robinson | 156/291 |
| 3,759,262 | 9/1973 | Jones, Sr. . | |
| 3,825,381 | 7/1974 | Dunning et al. . | |
| 3,834,286 | 9/1974 | Nystrand . | |
| 3,916,447 | 11/1975 | Thompson . | |
| 3,953,638 | 4/1976 | Kemp . | |
| 3,954,554 | 5/1976 | Curry et al. | 162/132 |
| 3,958,055 | 5/1976 | Hadley et al. . | |
| 3,994,396 | 11/1976 | Reilly et al. | 156/187 |
| 4,074,959 | 2/1978 | Curry et al. | 162/132 |
| 4,075,382 | 2/1978 | Chapman et al. . | |
| 4,108,812 | 8/1978 | Grueninger | 524/249 |
| 4,142,017 | 2/1979 | Blackburn et al. | 156/309 |
| 4,163,001 | 7/1979 | Carumpalos et al. | 524/110 |
| 4,166,001 | 8/1979 | Dunning et al. . | |
| 4,238,234 | 12/1980 | Lang | 106/31.28 |
| 4,300,981 | 11/1981 | Carstens . | |
| 4,437,917 | 3/1984 | Tao et al. | 264/121 |
| 4,487,796 | 12/1984 | Lloyd et al. . | |
| 4,507,163 | 3/1985 | Menard . | |
| 4,507,173 | 3/1985 | Klowak et al. . | |
| 4,507,351 | 3/1985 | Johnson et al. . | |
| 4,588,457 | 5/1986 | Crenshaw et al. . | |
| 4,610,743 | 9/1986 | Salmeen et al. . | |
| 4,610,915 | 9/1986 | Crenshaw et al. . | |
| 4,735,738 | 4/1988 | Willman . | |
| 4,759,391 | 7/1988 | Waldvogel et al. . | |
| 4,806,183 | 2/1989 | Williams . | |
| 4,806,418 | 2/1989 | Sigl . | |
| 4,816,320 | 3/1989 | St. Cyr . | |
| 5,091,032 | 2/1992 | Schulz | 156/219 |
| 5,158,523 | 10/1992 | Houk et al. . | |
| 5,217,576 | 6/1993 | Van Phan . | |
| 5,360,502 | 11/1994 | Anderson . | |
| 5,397,435 | 3/1995 | Ostendorf et al. . | |

(List continued on next page.)

FOREIGN PATENT DOCUMENTS

| 2 007 589 | 5/1979 | United Kingdom . |
|---|---|---|
| WO 89/12139 | 12/1989 | WIPO . |

OTHER PUBLICATIONS

"Starch in Paper", Tappi T 419 OM–80, ©1980.
PCT International Search Report of PCT Int'l Appln. No. PCT/US97/05385 dated Sep. 5, 1997 (4 pp.).

*Primary Examiner*—Jan H. Silbaugh
*Assistant Examiner*—Kenneth M. Jones
*Attorney, Agent, or Firm*—Fish & Richardson P.C.

[57] ABSTRACT

Multi-ply tissue product is bonded by an adhesive spray whose position is controlled so that the web path distance between the spray application and the location where the webs are forced together permits sprayed adhesive to partially but not completely set during travel over that web path distance at operating web speeds. Typically, the web path distance between the nozzle and the location is more than 140 inches. The webs are positioned one in back of the other and each is unwound onto its own carrier roll, with the spray positioned between the carrier rolls.

9 Claims, 7 Drawing Sheets

U.S. PATENT DOCUMENTS

| | | | |
|---|---|---|---|
| 5,437,908 | 8/1995 | Demura et al. | 428/154 |
| 5,466,318 | 11/1995 | Bjork . | |
| 5,543,202 | 8/1996 | Clark et al. | 428/152 |
| 5,552,013 | 9/1996 | Ehlert et al. . | |
| 5,562,790 | 10/1996 | Ehlert et al. . | |
| 5,607,760 | 3/1997 | Roe . | |
| 5,609,587 | 3/1997 | Roe . | |
| 5,611,890 | 3/1997 | Vinson et al. . | |
| 5,624,532 | 4/1997 | Trokhan et al. . | |
| 5,624,676 | 4/1997 | Mackey et al. . | |
| 5,653,930 | 8/1997 | Noda et al. . | |

SPRAY BONDED MULTI-PLY TISSUE

BACKGROUND OF THE INVENTION

This invention is in the general field of multi-ply tissue products as well as methods and apparatus for bonding tissue plies to make such products.

Various tissue products are made by laminating multiple layers of tissue. These layers or plies must be bonded to prevent them from delaminating or floating apart when they are converted into the final product or when they are used by the consumer.

Ply bonding of the individual tissue sheets into multi-ply layers is usually achieved by embossing them on converting equipment without applying adhesive. In this process, two or more tissue webs are simultaneously unwound and fed through a nip formed between male and female embossing rolls to emboss or crimp the webs and thereby bond them together. Often in making such products as napkins, the webs are embossed only around the perimeter of areas that will be cut into the individual napkins.

In a different process, tissue plies may be adhered using a chemical adhesive rather than by embossing. For example, Björk U.S. Pat. No. 5,466,318 discloses a process for laminating webs using a water based adhesive.

Controlling ply bonding is important and difficult. Inadequate, excessive or inconsistent ply bonding can jam complex, high-speed machinery, generate high waste, and provide unacceptable product. The strength of bonding by embossing (without adhesive) may vary depending, among other things, on water content or dryness of tissue webs, and on ambient air humidity. While bonding by embossing sometimes can be improved by increasing the pressure on the embossing rolls, such pressure can wear out the embossing rolls more quickly, particularly the female roll, which is usually a softer roll made of composite material onto which a pattern is impressed by the opposing, male, engraved metal roll. In addition, the journals and bearings of both embossing rolls can also wear out prematurely if subjected to increased pressure over a prolonged period.

The use of adhesives can avoid some of the problems of embossing, but adhesives also cause problems, such as "through bonding" or "blocking", in which adjacent laminates bond to one another, and, prevent unwinding of the laminate product from its roll. Non-uniformity of bonding also causes problems, such as wrinkling of the tissue and bad printing.

As noted, the bonding process may be part of the overall process for making the final multi-ply product. For example, multi-ply tissue products, particularly napkins, may be printed, e.g., by a letterpress or a flexographic process. In a typical letterpress printing process, a multi-ply web is first embossed, and then the central unembossed area of individual napkins is printed. In an alternative flexographic printing process, unbonded webs may be first run through a flexographic printing tower and then crimped with an embossing nip.

While the invention has broader application, we refer specifically to certain markets, particularly high quality napkins such as the party goods, food service, and other specialty napkin markets. These markets may require cloth-like character and feel, high wet strength, and the ability to be decorated with high quality printing. Increasingly, these markets have expressed preference for quality and complexity provided by flexographic printing.

It can be difficult to achieve cloth-like character and feel while also achieving satisfactory bonding of two or more plies of tissue to make one sheet of napkin tissue that will not come apart either when used by the consumer or when subjected to flexographic printing. The napkin must not deply, it must stay in one piece like a cloth napkin would. However, the use of adhesives and other additives to develop the resistance to ply separation tends to make the product stiff and destroy the cloth-like feel.

Another product requirement in this field is the need of strength while wet, which can be critically important to high quality paper napkins. Non-wet strength napkins may pull apart when subjected to moisture, such as spilled liquid or a wet glass, rendering then unsatisfactory for the high quality markets. Chemicals normally employed to impart wet strength (e.g., urea, phenol-formaldehyde) can reduce ply bond-strength which is already problematic, and can make the napkin stiffer.

With regard to decorated or printed napkins, certain napkin machines (e.g., those made by Servotec and Hoberna) which use flexographic printing have stringent ply requirements. As noted, these flexographic machines print the napkin first and emboss it afterwards, in contrast with letterpress napkin machines, which first emboss the edges of the napkin so that the plies of tissue are crimped together, after which the napkin is printed. In the flexographic process, it is critical that the plies be held together without embossing while the napkin is being printed. Floating plies as the tissue enters the printing stage result in jams and high waste together with machine downtime. In addition, the application of the ink causes the top layer of the tissue to expand if the plies are not well bonded, resulting in wrinkling, badly printed napkins, and extremely high costs from waste.

These problems are sometimes addressed by the use of much heavier napkin tissue (as has been done in Europe where some of the flexographic machines were introduced). Heavier tissue is more expensive.

SUMMARY OF THE INVENTION

We have discovered spray bonding processes and apparatus that provide substantially improved efficiency and process control of tissue bonding. The resulting adhesively bonded intermediate product is improved, particularly for use in flexographic printing applications. The final product may be a paper napkin, a paper towel, a medical disposable towel, a table cover or other similar tissue product. The cloth-like feel achieved by the invention is suitable for a wide range of markets, including not only markets where softness is important but also markets where a certain amount of product stiffness is required, such as the markets in which napkins are forced into plastic wraps containing cutlery (napkins made and packaged by "Austin-Gordon" or "Gordon"-type machines)

In particular, the invention provides a well bonded napkin product that can be used in converting apparatus, particularly flexographic printing apparatus. This ply-bonded tissue is constructed of lighter weight material which is less costly than the previously used tissue (particularly in Europe), yet the tissue exhibits printability and a cloth-like feel. Cloth-like character and feel, high wet strength, printability and low cost are achieved in a reliably ply-bonded product without the need to emboss before printing. The result is markedly enhanced ply bonding of the tissue layers and efficient and high quality printing, without detracting from the cloth-like character and feel which the use of adhesives can cause.

One aspect of the invention generally features a multi-ply adhesively bonded tissue roll with an extremely limited amount of waste at the core, which results from the absence of bonding or poorly controlled bonding during start-up of the bonding process. The roll comprises a bonded region which extends to within at least ¾ inch of the core. (This ¾ inch measurement is made from the outer diameter of the core, which is typically about 4 inchesm to the point in the product at which adehsive bonding begins.) Adhesive contact between the plies is substantially continuous over the bonded region of the roll (i.e., at radiuses greater than ¾"), and the strength throughout the bonded region of the roll is high, substantially without through bonding in that region. While bond strengths of at least 100 mg/cm are achieved, in one particular embodiment, the bond strength is at least 400 mg/cm.

In another aspect of the invention described below, we have found that careful process control permits lower adhesive loading and the use of a pressurized nip to force the webs together without unacceptable adhesive build-up on the nip rolls, particularly for two-ply tissue product. Strong two-ply adhesion can be achieved with lower adhesive loading, thus avoiding problems caused by inconsistent adhesive loading while at the same time enabling better control over winding tension (because the nip controls tension transmitted upstream). Thus, this aspect of the invention features methods of producing an adhesively bonded two-ply tissue product by: spraying an adhesive mixture upwardly onto one of the moving webs from at least one nozzle array positioned in a spray location below one of the webs; compressing the webs together as they run through a nip formed by two nip rolls positioned at a compression point downstream of the spray location; and winding the bonded two-ply tissue product onto a roll under tension using a winder which pulls the two-ply product, exerting tension on it. In this aspect of the invention, it is practical to use a pressurized nip to force the adhesively bonded webs together. The distance between the spray location and the nip is selected to permit sprayed adhesive to partially but not completely set during travel over that distance at operating web speeds. The webs may be forced together with nip rollers that have enough pressure to substantially confine winder tension to the nip-to-winder portion of the web path, as opposed to transmitting winder tension upstream to the parent reels (i.e. the reels on which the tissue stock has been supplied to the bonder), thereby providing improved control over winder tension. Because the spray location is carefully controlled, it is possible to use such a nip without unacceptable adhesive build-up on the nip rolls.

In the above process, the adhesive is considered to be partially but not completely set when it has what is known in the field as "green tack". At that stage, the adhesive is damp to the touch, but it does not transfer to another surface, so the adhesive will contact bond, but it will not migrate so far through the tissue web that it causes through bonding as the bonded webs are wound into a roll.

Typically, each tissue web is unwound over its own carrier roll, and spray nozzle(s) are positioned between the carrier rolls, particularly adjacent to and downstream of the rear carrier roll. For example, the web travel distance between the nozzles and the nip is more than 140 (and even more than 200 but less than 500) inches.

In a third aspect, the invention features methods of producing tissue product with more than 2 (usually 3 or 4) plies. The method uses at least two spray nozzle arrays, a rear array to spray the bottom of an upper web and a forward array to spray the bottom of an intermediate web. The multiple webs are tensioned by a winder around a compression roll (usually but not necessarily a nip roll as described above) to compress the webs. The web travel distance between the two nozzle arrays and the nip roll is controlled so that adhesive is partially but not completely set when it reaches the roll. Both nozzle arrays are positioned as discussed above. Typically the forward nozzle array will be more than 140 inches (preferably more than 200 inches) from the compression roll.

Preferably, webs are run at a speed of well over 1500 feet/min (more preferably 2,300 feet/min or higher), and the dwell time for adhesive applied to the web is between 0.3 and 1.3 seconds. Dwell time is the period from application of adhesive to the web until the adhesive treated web reaches the nip.

Alternatively, to make three- or more ply product, the number of sprayer locations may be two less than the number of plies being bound. For example, four moving webs are positioned vertically to form an upper web, a upper-middle web, a lower-middle web, and a bottom web respectively, and only two arrays of adhesive spray nozzles are used: a first array positioned in the rear location to spray upwardly onto the bottom surface of the upper-middle web; and a second array positioned in a third location to spray upwardly onto the bottom of the lower-middle web. Similarly, the method may be used to make three-ply tissue by positioning three moving webs as an upper web, a middle web, and a lower web, respectively, and using only one adhesive nozzle array, which is positioned in the rear location to spray upwardly onto the middle web.

A significant advantage of the method is that it can be used in series with high-speed tissue-forming equipment, i.e., reels of tissue webs are provided by forming them on equipment including a dryer, and winding up the resulting webs, which then are bonded at a rate which exceeds the rate at which the webs are produced. When we say that the webs are bonded at a rate which exceeds the rate at which the webs are produced, we take into account down time at the beginning of a run for loading reels of freshly made unbonded tissue and time at the end of a run to unload bonded multi-ply tissue. We also take into account similar down time for the tissue production process. Finally, we take into account that at least two and sometimes three or four tissue webs must be made to produce a single multi-ply bonded web so that, as a rough approximation and if all other things were equal, a two-ply bonding process could run at ½ the speed of the tissue manufacturing process without becoming a bottleneck. In general, the web speed exceeds 1500 feet/min (preferably over 2000 feet/min) during a significant portion of the bonding process.

Tissue making relies on management of the creping process, in which dried tissue is scraped from a heated drying cylinder to which it has been adhered. Creping is improved generally when the drying cylinder is hot and the tissue is relatively dry at the point of creping. The above described bonding process is advantageous in that it can bond relatively dry webs, without adding or retaining moisture at the tissue-forming stage to accommodate the needs of the bonding process. For example, tissues produced in a process that dries them to no more than 6.5% water can be used without further treatment.

Control over the spray process may include controlling the adhesive mixture flow with respect to web travel speed, for example, to maintain a substantially constant (+or −20%) overall rate of addition of dry adhesive per unit area of web at different speeds (preferably the addition rate is between 5 and 25 (most preferably between 5 and 20) pounds/million square feet of multi-ply web). The method may also include controlling the air pressure used to spray the mixture at different web travel speeds.

Typically, the method includes at least two phases, a running phase and a substantially slower transition phase (e.g., starting up or slowing down the winder). The amount of liquid adhesive delivered per minute is substantially proportional (±20%) to the web speed during both the running phase and the transitional phase. The atomizing airflow pressure or flow rate may also be controlled responsive to changes in web travel rate between the running and the transition phase.

Multiple nozzles may be positioned on supports in a shower housing which includes a drain for over-spray. The shower housing includes a damper that is movable from a first damper orientation that prevents nozzle spray from reaching the moving web to a second damper orientation in which spray reaches moving web. During the start-up phase, the damper is positioned in the first orientation so that web is not bonded. The shower housing may be raised from a an inactive position during idle periods when the web is slowed or stopped to a second active position. Adhesive may be purged from the nozzles in a cycle that includes introducing flush water and/or airflow into the shower nozzle.

Preferred adhesives are aqueous mixtures, e.g., of carboxymethyl cellulose; polyvinyl alcohol; or starch. The spraying process control described above enables the use of higher (for example at least 13%) solids in the liquid adhesive, which in turn results in shorter drying times.

After the adhesive is applied, the webs may be forced together by a pair of rolls (e.g. calender rolls) that are in contact as the two webs pass through. For example, these rolls may be biased together to form a pressure nip. The bonded tissue plies are then wound up on a winder downstream of the nip, and tension on the winder is substantially maintained downstream of the nip and is not substantially communicated upstream of the nip.

II. Apparatus

The above method is practiced using apparatus which includes:

A. a rear reel stand and a rear carrier roll above the rear stand, forming the beginning of an upper web path;

B. a forward reel stand and a forward carrier roll above the forward stand, forming the beginning of a lower web path, the upper web path converging with the lower web path at the forward carrier roll;

C. an adhesive applicator system for applying adhesive to the bottom of tissue moving in the upper web path, the adhesive applicator system comprising:

i. an array of spray nozzles positioned at a spray location below and generally transverse to the upper tissue path, and oriented to spray generally upward, toward the bottom surface of the upper tissue, the first location being between the rear and the forward carrier rolls;

ii. an air pressure source connected to provide air to the spray nozzles iii. an adhesive source connected to provide a flow of adhesive to the spray nozzles, and D. a pair of nip rolls positioned downstream from the spray head array and the forward carrier roll, the nip rolls being in both the upper and lower tissue paths, the nip rolls forming a nip for compressing the upper and the lower tissue together E. a winder downstream of the nip for winding up bonded tissue product, the winder being designed to have a running speed within a predetermined range, the nip being spaced apart from the spray location at least 230 inches, to permit sprayed adhesive to partially but not completely set during travel over that distance at speeds in the predetermined range.

The location of the array of spray heads is controlled as described above. For example, the nip is spaced apart from the first (rear) location by at least 200 inches to permit sprayed adhesive to partially but not completely set during travel over that distance. Specifically, the array is located between the rear and the forward carrier rolls.

The apparatus may also include: A. an adhesive pump providing a flow of adhesive to the spray heads; B. an air pump providing air pressure to the spray heads; C. a sensor for sensing the speed of travel of at least one of the tissue webs, which provides a web speed signal to a signal processor; and D. an adhesive flow control system for controlling the flow of adhesive to the spray heads; the adhesive flow control system includes a flow rate monitor, a signal processor which receives a signal from the monitor and provides signals to an adhesive flow motor, responsive to the web speed signal, so that the adhesive delivery rate is varied in response to web travel rate.

When more than two tissue webs are being bound, the apparatus includes at least one intermediate reel stand and intermediate carrier roll, forming the beginning of an intermediate web path, the intermediate carrier roll being positioned between the rear and the forward carrier rolls. The apparatus may also include additional arrays of spray heads positioned at a second (forward) location below and generally transverse to the intermediate web path, and oriented to spray generally upward, toward the bottom surface of the intermediate tissue.

The apparatus can operate fast enough to process the output of the web-forming equipment substantially without backlog or slowing of that equipment.

A signal processor includes circuitry to control the amount of adhesive flow supplied to the nozzles substantially proportional to the web travel speed, so as to provide a substantially constant overall ratio of dry adhesive per unit area of web at different web speeds. The controller also includes circuitry to establish the other method controls described above, such as the controls on adhesive flow, airflow damper position, and shower housing position. The controller also controls a purge cycle in which flush water and/or airflow is directed into the nozzle.

As noted, the above process and apparatus use tissue that is very dry without need for further modification. The process avoids the need to emboss as a bonding process. The process permits effective use of high speed tissue forming machinery. The process improves utilization and reduces waste, particularly waste from discarding the beginning and end of rolls due to improper adhesive loading at transition speeds.

BRIEF DESCRIPTION OF THE INVENTION

DESCRIPTION OF THE PREFERRED EMBODIMENTS

Figure 1:
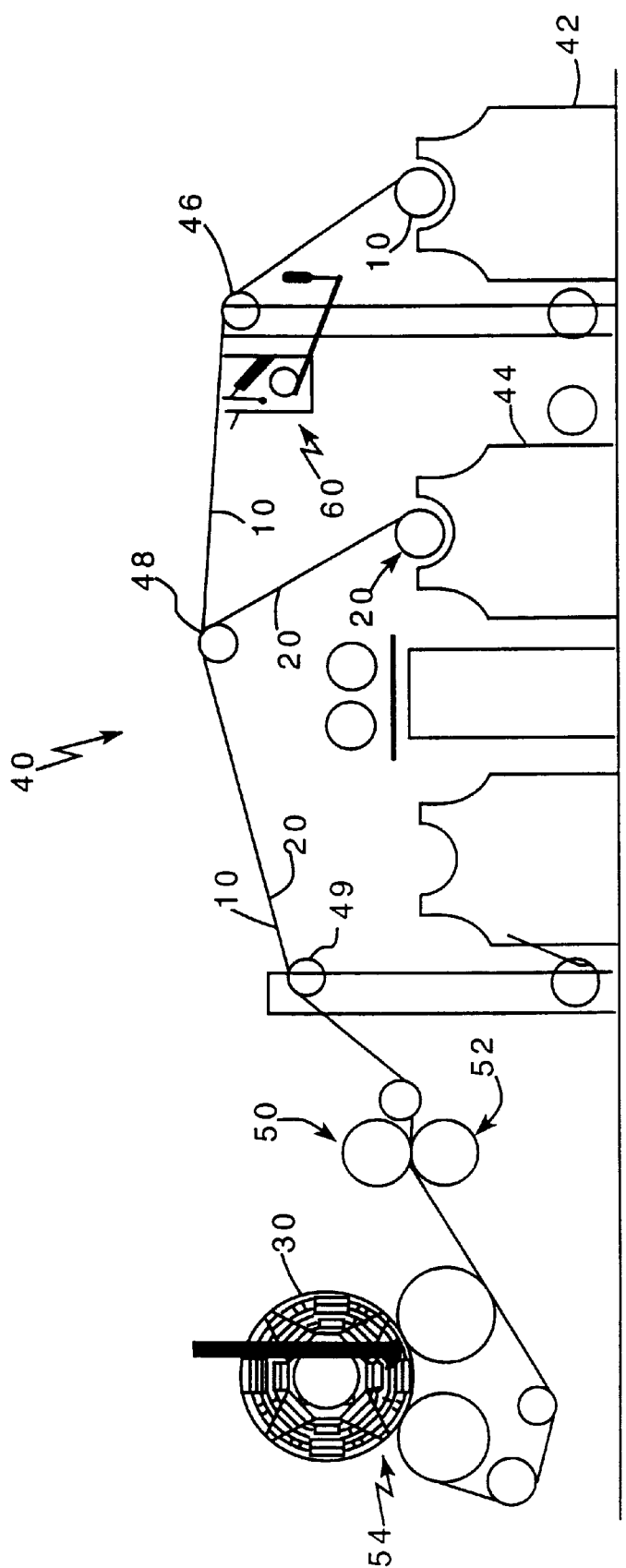
FIG. 1 is a diagram showing apparatus for spray bonding two moving tissue webs.

In FIG. 1, individual tissue webs 10 and 20 are spray bonded on ply bonder 40 to form a two-ply tissue product 30. Bonder 40 includes two reel stands 42 and 44 suitable to receive webs as they are produced by tissue forming apparatus (not shown).

Webs 10 and 20 are unwound from the reel stands and threaded over carrier rolls 46 and 48 to roll 49 and from there to calender rolls 50 and 52 and winder 54.

Figure 3A:
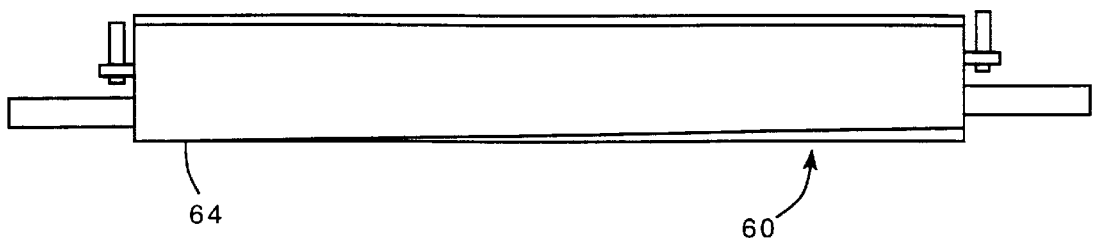
FIGS. 3A through 3C are top, front and side views, respectively, of a shower housing.
Figure 3B:
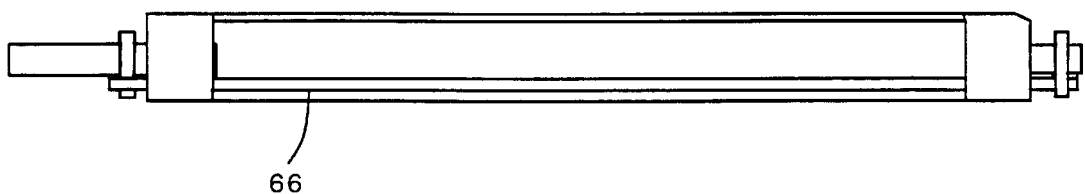
Figure 3C:
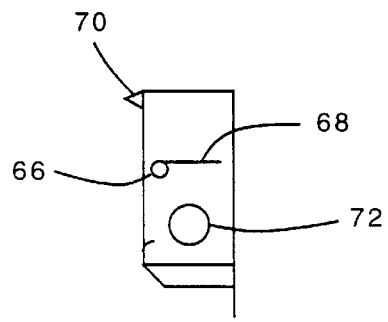

A shower assembly 60 is positioned between carrier rolls 46 and 48, beneath, and across the width of (i.e. transverse to the movement of), web 10. Shower assembly 60 (shown in greater detail in FIGS. 3A–3C) includes a row of nozzles (shown in FIG. 4) positioned in a rectangular housing 64, which extends across the width of the web (about 112 inches) and the housing section (FIG. 3C) is about 9×11 inches. Housing 64 (shown for clarity in FIGS. 3A–3C without nozzles) includes several features described in greater detail below. Axle 66 extends across the width of the housing, and it controls rotation of a baffle plate (or "flapper") 68. A trailing lip 70 extends from the rear (trailing) edge of housing 64. Side ports 72 are provided for air adhesive conduits (shown in FIG. 4) which supply nozzles 62.

Figure 4:
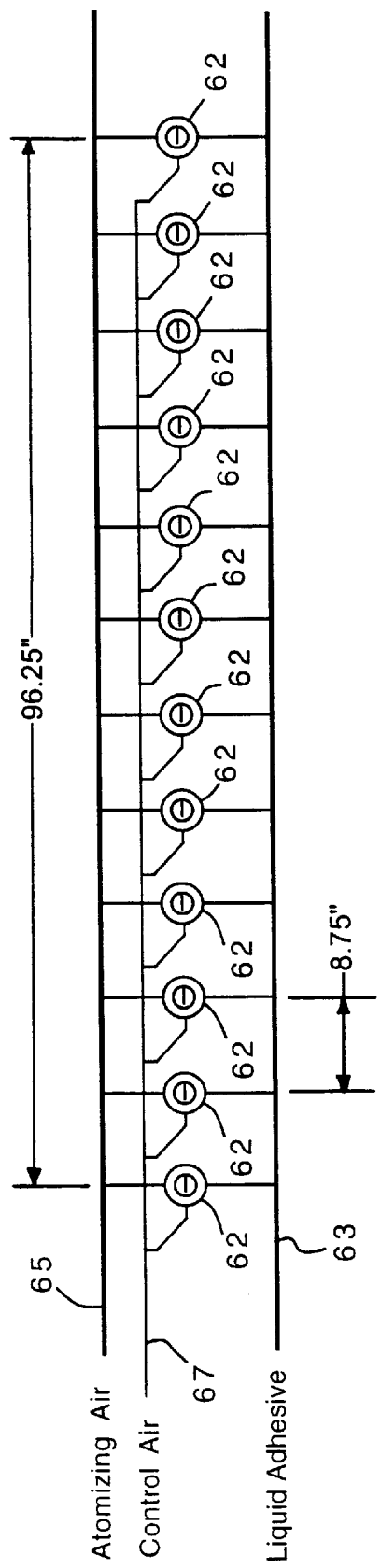
FIG. 4 is a diagram of the valves and supply conduits for the housing of FIGS. 3A–3C.

FIG. 4 shows an array of 12 nozzles 62 spaced about 8.75 inches center-to-center. Generally, the number of nozzles is selected to provide 200% coverage—i.e., any given point on the web generally receives output from two nozzles. As described in greater detail below, each nozzle is connected to a liquid adhesive supply 63, and atomizing air supply 65 and a control air supply 67.

Figure 5:
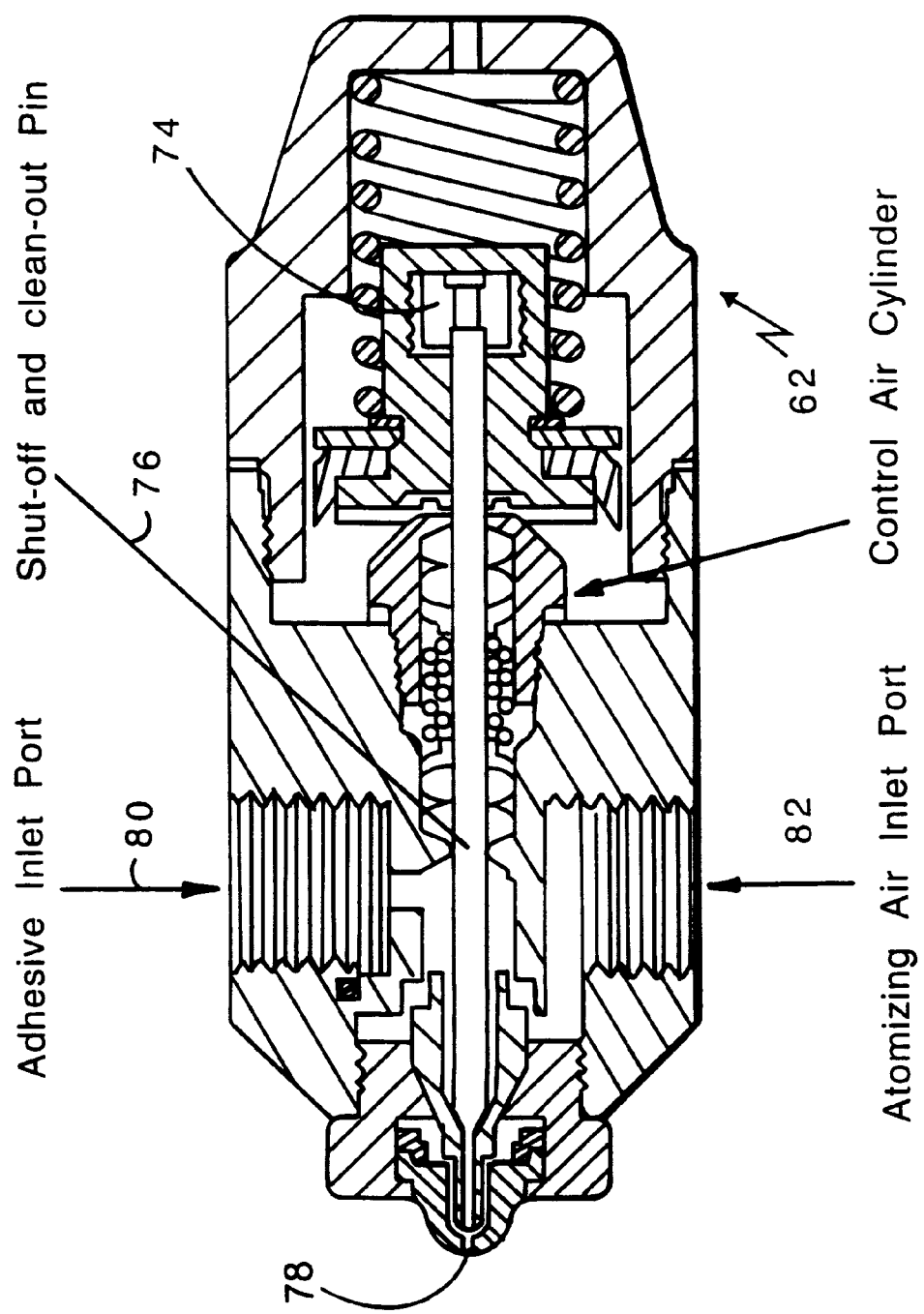
FIG. 5 is a sectional view of a nozzle.

A representative nozzle 62 is shown in FIG. 5. The nozzle comprises a control chamber 74 which drives a shut-off and clean-out pin 76 to shut off or open orifice 78. Adhesive is supplied from one side port 80, and air is supplied from an atomizing air port 82 on the other side of the nozzle. The pressure in chamber 74 overcomes the spring bias, driving pin 76 rearwardly and opening orifice 78. Generally, the nozzle produces a fine flat fan spray with a fairly wide spray angle (thus reducing the number of nozzles needed). The wider the spray angle, the fewer nozzles that are required, thus reducing costs and generally stabilizing and maximizing adhesive flow in any single nozzle.

Figure 6:
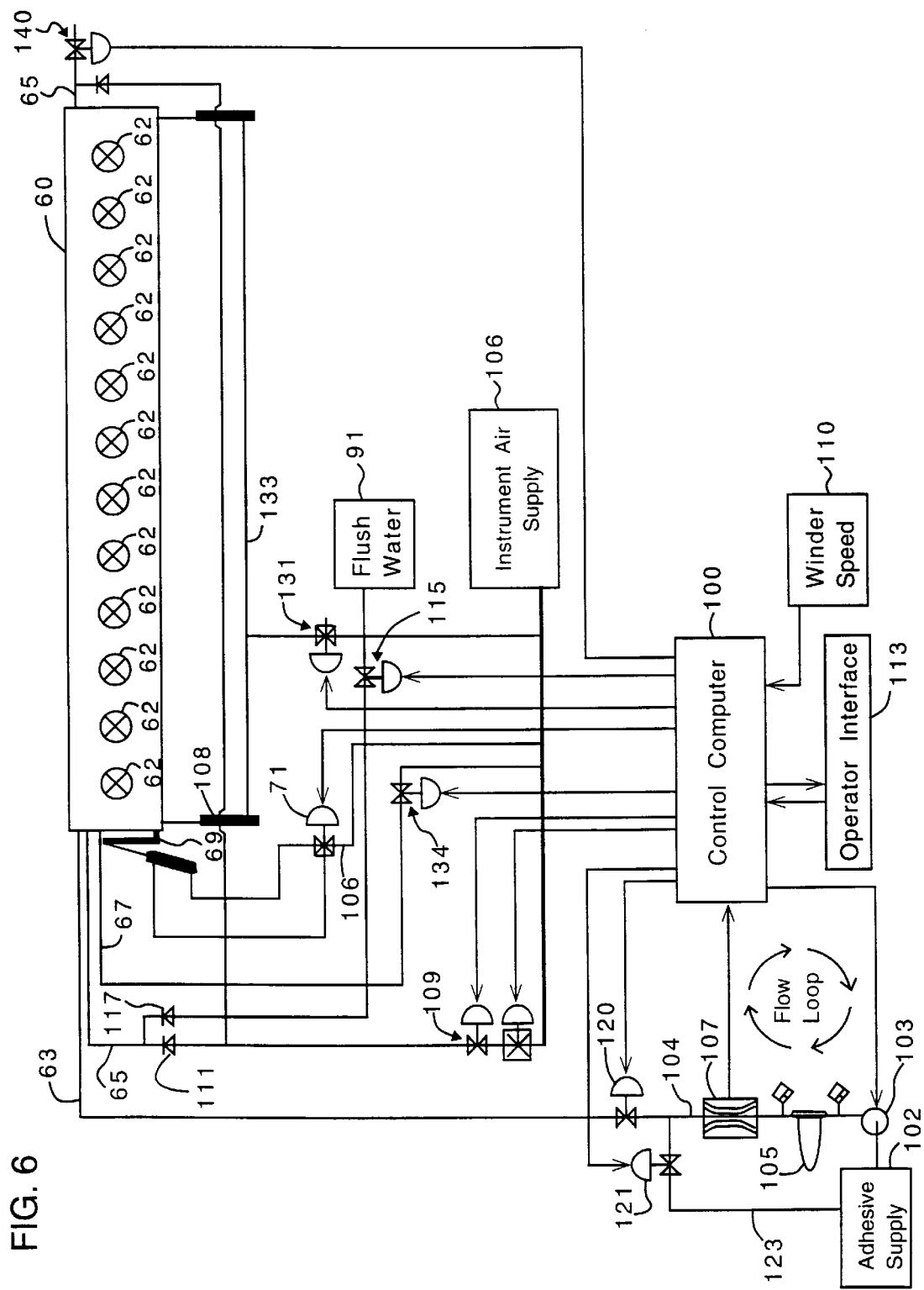
FIG. 6 is a diagram of controls for the apparatus of FIG. 1.

FIG. 6 is a diagrammatic representation of the systems that supply and control the equipment described above.

Shower assembly 60 and supply conduit 63 are connected to adhesive reservoir 102 and supply pump 103 via supply conduit 104, which includes filter 105 and valve 120. Pump 103 is a positive displacement pump, driven by a variable speed motor to control adhesive flow. A magnetic flow meter 107 monitors flow in conduit 104. Valves 120 and 121 as a pair can be set to direct adhesive flow to conduit 63 (valve 120 open and 121 shut) or to return loop 123 which returns adhesive to supply 102 when valve 121 is open and 120 is shut.

The shower assembly is connected to atomizing air supply conduit 65 (introduced through both sides of housing 60) from air supply 106. Atomizing airflow is controlled by supply valve 109.

Nozzle control air is provided via conduit 67, and is controlled by pneumatic valve 134, which is supplied by air supply 106.

Flapper control arm 69 is connected to pneumatic controller 71, which is supplied from via air supply conduit 106. Flush water supply 91 is connected to atomizing air supply conduit 65 via control valve 115 and check valve 117.

Shower housing assembly lift mechanism 108 is controlled by pneumatic valve 131 which is pressurized by air supply 106 via conduit 133.

Quick purge valve 140 opens the atomizing air conduit 65 to purge any liquid in it at the end of the purge cycle described below.

A computer (signal processor) 100 is separately connected to adhesive supply pump 103 and to air supply valve 109. Computer 100 is also connected to control the speed of pump 103 responsive to signals it receives from: a) flow meter 107; b) operator input of the adhesive flow set point; and c) winder speeed. Computer 100 is also connected to other components as described above and shown in the figures.

A system of compressed air supply 106 supports the number of operations described above, e.g., it provides pressure and volume to operate the spray nozzles and various system components described below. The compressed air capacity required will vary depending on the needs of a particular system. Generally, a source on the order of 40CFM at 80 psi is adequate.

Computer 100 reads the winder speed (WS), the adhesive flow (AF) and any control modes supplied by operator input 113. From these values, computer 100 calculates the required adhesive flow (AF), so that $AF=K \times WS \times SP$, where WS is the winder speed; SP is an operator supplied set point for the adhesive loading—i.e., dry weight of adhesive per area of web. The set point for making a two-ply product typically will be on the order of 5–25 (more preferably 5–20) pounds of dry adhesive per million square feet of web. When three-ply tissue is made with two showers, each shower is set in the above range. Where a single shower is used to bond three plies, the adhesive spray must penetrate the middle layer to bond both the upper and lower layer. In that event, the set point for that shower is higher (e.g. in the range of 30–35 pounds/million square feet). "K" a proportionality constant that takes into account the width of the winder, the density of adhesive mixture (gallons of mixture per unit of dry adhesive weight) and that reconciles and scales units used.

Figure 2:
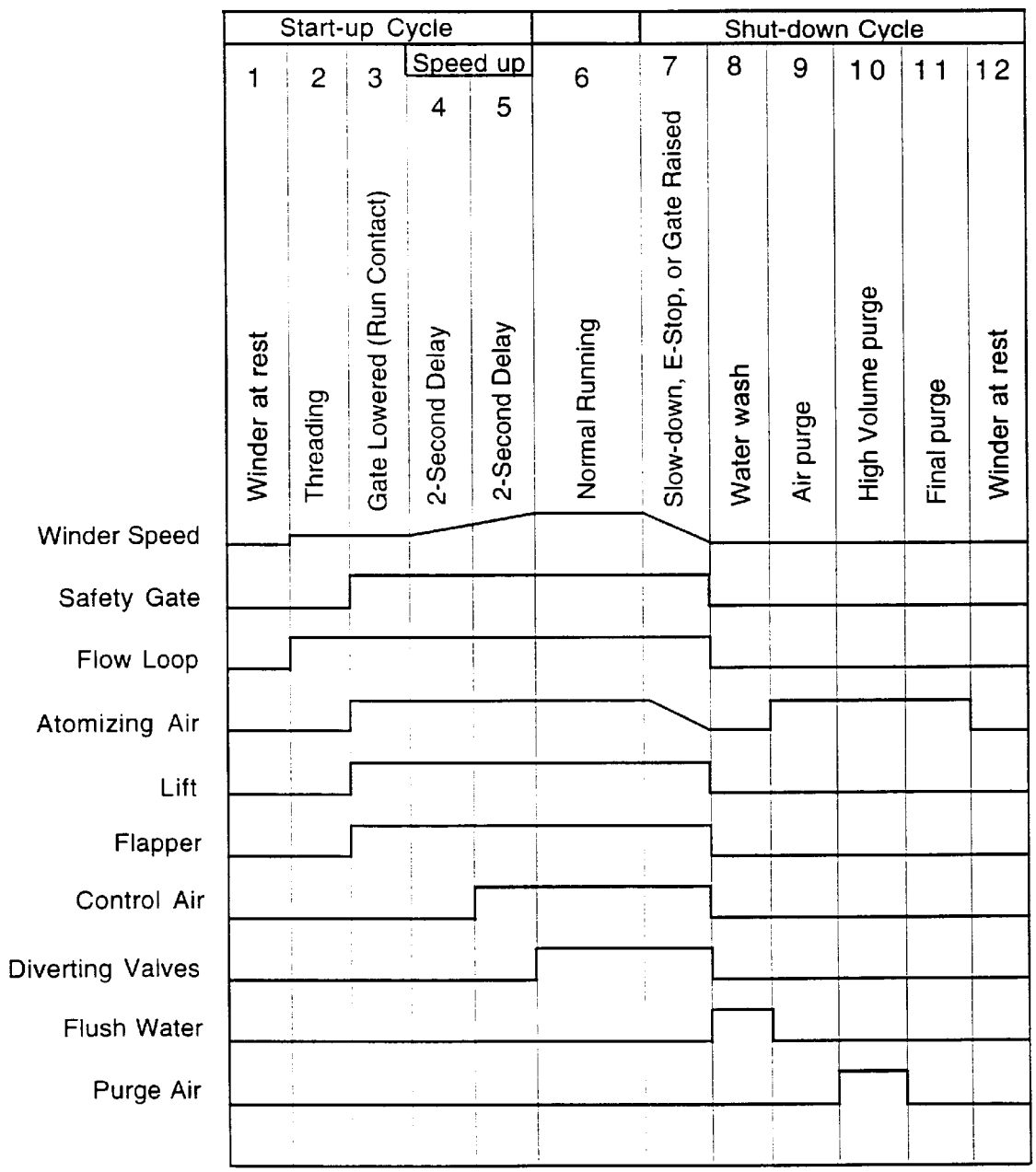
FIG. 2 is a chart of a operating sequences during a process for spray bonding moving tissue webs.

Computer 100 also is programmed with routines to
1. start, stop and control the speed of the adhesive feed pumps;
2. start, stop and regulate atomizing air;
3. turn control air on and off;
4. open and close the flapper;
5. raise and lower the shoer box;
6. toggle adhesive diverting valves;
7. flush the shower by,
   i. starting and stopping flush water,
   ii. opening and closing the quick purge valve,
   iii. starting and stopping the atomizing air;

The operation of the above described equipment will be better understood with reference to the following operating sequences diagrammed in FIG. 2. Overall operation can be divided into a start-up cycle, a normal running mode, and a shut-down cycle. The operator may select manual or automatic operation. At rest (col. 1), the winder is off, a run interlock is open, the adhesive flow is off, the atomizing air is off, the shower housing is in the lower, inactive position, the flapper is closed, the control air is off, valves in the adhesive flow loop are set to recycle adhesive to the supply (i.e., valve 120 is closed and valve 121 is open), flush water is closed, and purge air is closed.

In automatic operation, the computer begins start up with a threading mode (col. 2) by turning the winder on to a slow, threading speed, and turning on the pump to begin adhesive flow (with valve 121 remaining open and valve 120 remaining closed). The computer then enters a mode in which the web is running (col. 3) by closing the run interlock, turning on the atomizing air valve 107, and moving the shower housing and the flapper into operating positions. Once the web running status is achieved, there are two two-second speed-up checks (cols. 4 and 5) as the winder speed is increased. Control air is turned on between these two checks.

Immediately after the second speed check, diverter valve 121 is closed and supply valve 120 is opened to start adhesive flow to the nozzles. The apparatus is then in its normal running mode (col. 6).

Shut-down includes several phases, and it may be initiated manually or automatically as the winder slows and a low speed threshold (e.g. <100 feet/min) is reached.

In shut down, atomizing air is ramped down with the winder, and then both are turned off. The run interlock is opened, and adhesive flow is diverted by closing valve 120 and opening valve 121. The shower housing is lowered and the flapper is closed. Nozzle control air pressure is also shut off.

A nozzle wash cycle is achieved by introducing flush water into the atomizing air conduit 65. A nozzle air purge cycle (col. 9) is achieved by turning off flush water, and starting atomizing air flowing through the nozzles. Atomizing airflow is increased for the final purge (col. 10) by opening quick purge valve 140 at the far end of the nozzle housing. When the atomizing air and quick purge valve 140 are turned off, the system is at rest (col. 12).

A flush mode as described above can be instituted manually whenever the shower is in auto mode and the winder is not running. The water valve will stay open for as long as 15 minutes (compared to the 15 seconds in the auto mode).

A manual mode permits each of the control functions to be operated manually and independently.

Bond strength of the product may be tested according to a standardized protocol. For example, small strips of bonded product (typically about 2.5 inches wide) are subjected to known force to determine the amount of force required to separate the tissue layers. In general, for flexographic product applications, the bond strength should exceed 100 mg/cm. Preferably the median value of the bond strength should be over 400 mg/cm. If necessary, the measured force for separating a given strip may be doubled using two strips, and obtaining a value for separating both strips.

Because the product is bonded with a carefully controlled adhesive spray, the adhesive is substantially continuous and uniform, even when analyzed at a detailed level. For example, when a starch or PVA adhesive applied by the above spray is evaluated using a standard iodine visualizing procedure (e.g., spraying a 0.01N $I_2$ solution on the tissue from a standard pump sprayer), color development indicative of adhesive shows very little non-uniformity, and what non-uniformity exists is generally random, at least over areas greater than 1 $mm^2$. In contrast, adhesive applied by a textured roll will show a regular uniform matrix of starch dots over areas up to 1$cm^2$.

Figure 7:
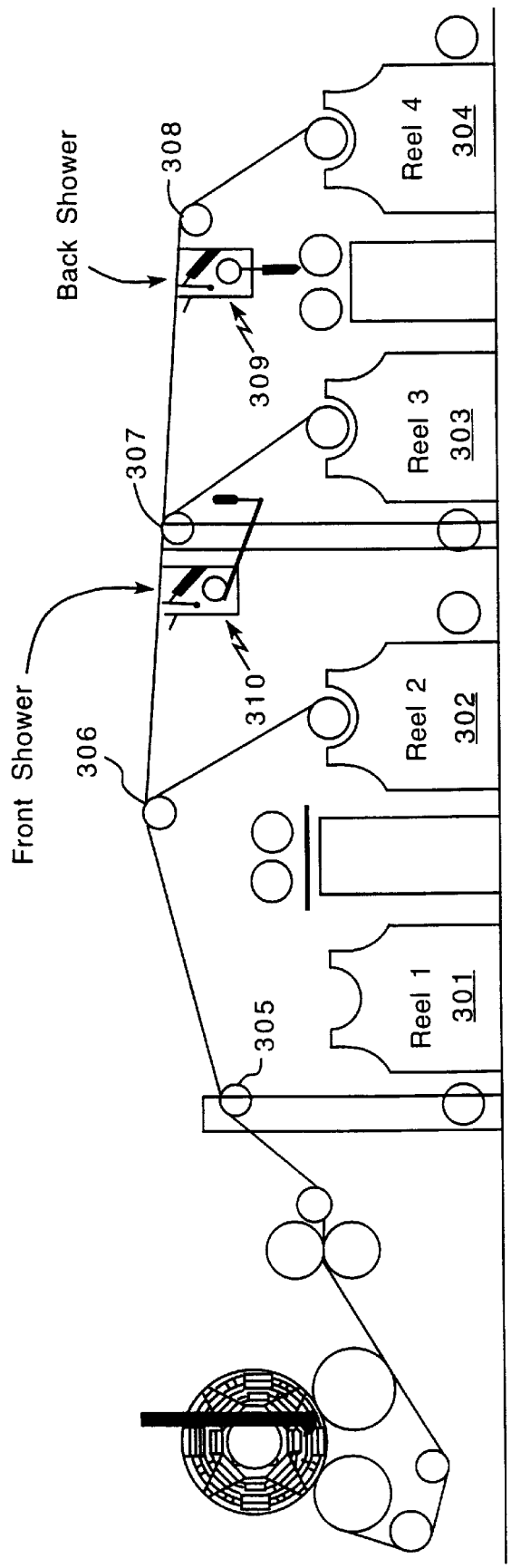
FIG. 7 shows an alternative embodiment for producing four-ply tissue.

Other embodiments are within the following claims. For example, in FIG. 7, each of four reel stands 301–304 is occupied, and one of carrier rolls 305–308 is included to carry web from each of the respective rolls.

Only two shower assemblies 309 and 310 are positioned between carrier rolls 301 and 302, and between 302 and 303, respectively. No shower is necessary or desirable between carrier rolls 303 and 304. Instead, the adhesive load from shower 309 is increased to provide sufficient adhesive to bond webs 303 and 304.

In an alternative embodiment (not shown) three-ply tissue may be manufactured by omitting the roll on stand 301. Shower assembly 310 is optional in that configuration.

What is claimed is:

1. A roll comprising a sheet of multi-ply, adhesively bonded, unembossed tissue product wound around a core, wherein the multi-ply tissue product comprises: i) n plies of tissue bonded to form said multi-ply sheet of said product wound around said core, each of said plies containing y square feet, and ii) adhesive, wherein said adhesive forms n−1 ply bonds between said n plies of tissue, said tissue product being further characterized in that:

a) each of said ply bonds extends substantially across the entire width of the product and to within at least ¾ inch of the core;

b) said adhesive is applied between at least two of said plies and may optionally migrate to another of said plies in said multi-ply sheet, but said adhesive is applied such that it substantially does not migrate from one multi-ply winding of said sheet to an adjacent multi-ply winding of said sheet;

c) the product's dry weight of adhesive is less than 25 pounds per million square feet of tissue ply bond, where the number of square feet of tissue ply bond =y*(n−1) and the dry weight of adhesive is sufficient to provide a median adhesive bond strength of at least 400 mg/cm; and d) each ply in the product is tissue.

2. A roll comprising a sheet of multi-ply, adhesively bonded, unembossed tissue product wound around a core, wherein the multi-ply tissue product comprises: i) n plies of tissue bonded to form said multi-ply sheet of said product wound around said core, each of said plies containing y square feet, and ii) adhesive, wherein said adhesive forms n−1 ply bonds between said n plies of tissue, said tissue product being fiber characterized in that:

a) each of said ply bonds extends substantially across the entire width of the product and to within at least ¾ inch of the core;

b) said adhesive is applied between at least two of said plies and may optionally migrate to another of said plies in said multi-ply sheet, but said adhesive is applied such that it substantially does not migrate from one multi-ply winding of said sheet to an adjacent multi-ply winding of said sheet;

c) the product's dry weight of adhesive is between about 5 and 25 pounds per million square feet of tissue ply bond, where the number of square feet of tissue ply bond=y*(n−1); and d) each ply in the product is tissue.

3. The roll of claim 1 or claim 2 which the adhesive is starch.

4. The roll of claim 2 characterized in by a bond strength of at least 400 mg/cm throughout the bonded region of the roll.

5. The roll of claim 1 or claim 2 in which the adhesive comprises a substance selected from the group consisting of starch, carboxymethyl cellulose, and polyvinyl alcohol.

6. The roll of claim 1 or claim 2 in which said roll consists essentially of two tissue plies and adhesive.

7. The roll of claim 1 or claim 2 in which said roll consists essentially of four tissue plies and adhesive.

8. The roll of claim 1 in which the product's dry weight of adhesive is at least about 5 pounds per million square feet of tissue ply bond.

9. The roll of claim 1 or claim 2 in which said roll consists essentially of three tissue plies and adhesive.

* * * * *